(12) United States Patent
Bindana et al.

(10) Patent No.: US 11,758,068 B2
(45) Date of Patent: Sep. 12, 2023

(54) METHODS AND SYSTEMS FOR ADDING ONE OR MORE BOOKMARKS WHILE SCANNING A DOCUMENT

(71) Applicant: XEROX CORPORATION, Norwalk, CT (US)

(72) Inventors: Srinivasarao Bindana, Kakinada (IN); Shalini Kondore, Old-Alwal (IN); Sainarayanan Gopalakrishnan, Chennai (IN); Jagadeeswaran Lakshmipathy, Chennai (IN)

(73) Assignee: XEROX CORPORATION, Norwalk, CT (US)

(*) Notice: Subject to any disclaimer, the term of this patent is extended or adjusted under 35 U.S.C. 154(b) by 114 days.

(21) Appl. No.: 17/357,042

(22) Filed: Jun. 24, 2021

(65) Prior Publication Data
US 2022/0417384 A1 Dec. 29, 2022

(51) Int. Cl.
*H04N 1/32* (2006.01)
*H04N 1/00* (2006.01)

(52) U.S. Cl.
CPC ....... *H04N 1/32133* (2013.01); *H04N 1/0044* (2013.01); *H04N 1/00413* (2013.01); *H04N 1/00225* (2013.01); *H04N 2201/0094* (2013.01)

(58) Field of Classification Search
CPC .......... H04N 1/32133; H04N 1/00413; H04N 1/0044; H04N 1/00225; H04N 2201/0094
USPC ....................................................... 358/1.15
See application file for complete search history.

(56) References Cited

U.S. PATENT DOCUMENTS

| | | | | |
|---|---|---|---|---|
| 2012/0303962 A1* | 11/2012 | Ghani | ................ | G06Q 20/3821 713/176 |
| 2016/0275060 A1* | 9/2016 | Kleinferchner | ....... | G06F 16/168 |
| 2018/0278795 A1* | 9/2018 | Zhang | ................ | H04N 1/00331 |

* cited by examiner

*Primary Examiner* — Neil R McLean

(57) ABSTRACT

The present disclosure discloses methods and systems for allowing a user to add one or more bookmarks while scanning a document. The method includes receiving a document for scanning from a user. Once received, a user interface is displayed to the user to select an option to add one or more bookmark to the document. The document is scanned to get scanned pages of the document. Based on the selection of the option by the user, one or more bookmarks are added to one or more scanned pages of the document. The scanned document including the one or more bookmarked pages is sent to the one or more recipients for the desired action.

10 Claims, 17 Drawing Sheets

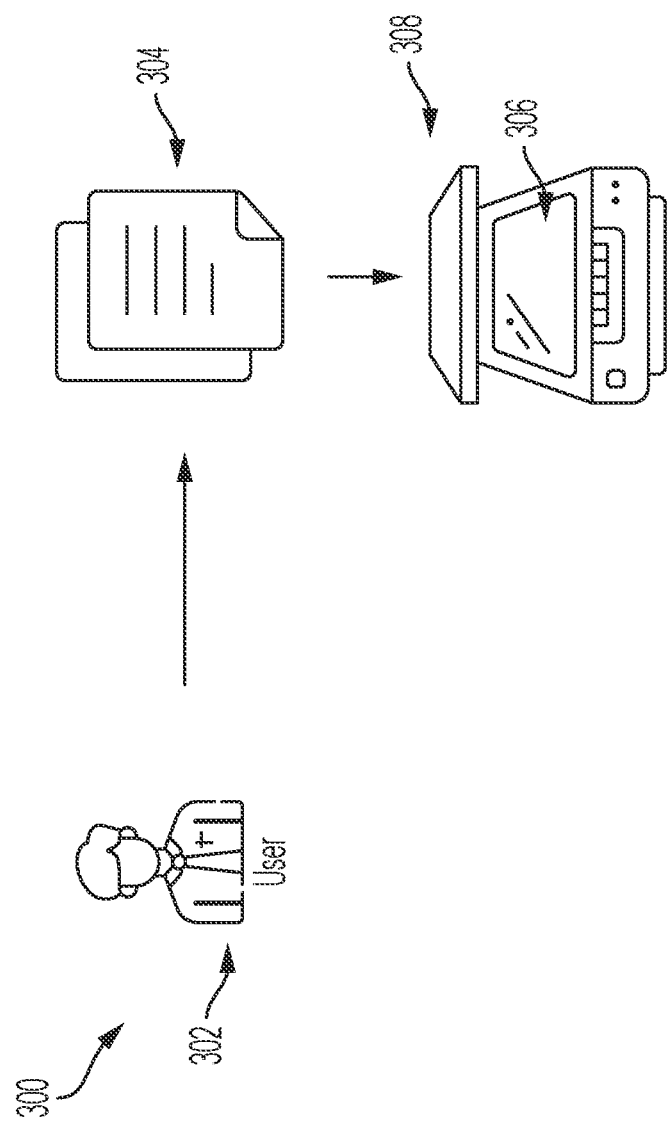

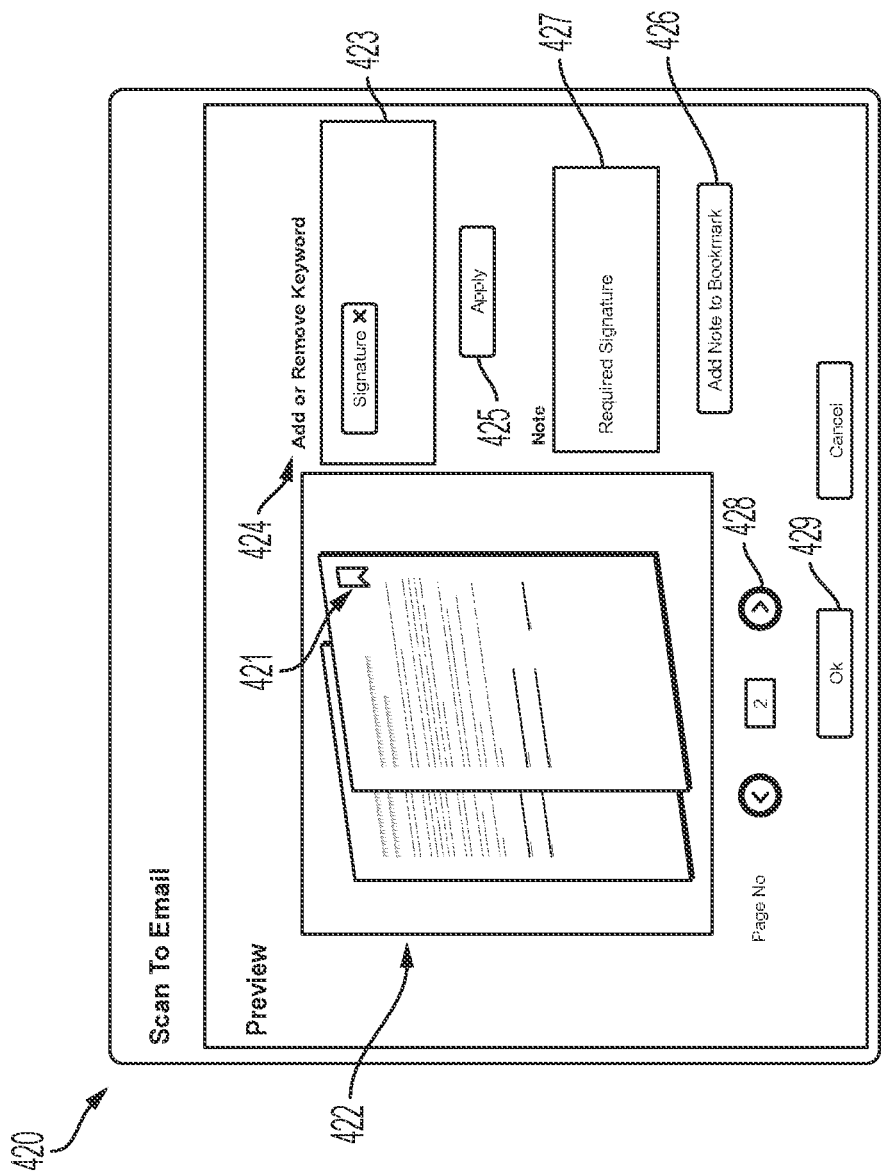

METHODS AND SYSTEMS FOR ADDING ONE OR MORE BOOKMARKS WHILE SCANNING A DOCUMENT

TECHNICAL FIELD

The present disclosure relates to the field of scanning. More specifically, the disclosure relates to methods and systems for adding one or more bookmarks to a document while scanning the document.

BACKGROUND

Multi-function devices have become quite common and essential in our day-to-day life. A user willing to share an e-copy of a document with other users scans the document at the multi-function device and shares the scanned document with other users. Sometimes there can be scenarios when a user scanning a document wants to indicate a required action to be taken by another user who receives the scanned document. One such scenario can be when a company shares an offer letter with a candidate and needs the candidate to sign the letter and send it back to the sender. In such cases, the company writes an email including the offer letter and provide details about the pages where the candidate needs to sign. Another scenario can be when a company official shares a technical report with a client and wishes to bring his attention to some important details on a specific page of the report. In such cases, the company official mentions important details in an email.

In most of such scenarios, the user is required to, first, scan the document and separately mention the required action with the page number, etc. in an email or otherwise over a phone call. Secondly, after scanning, the user uses a separate third-party tool or application to bookmark the required pages of the document. This could be very frustrating and time-consuming. Also, this is prone to errors, as the user might make some mistakes while adding bookmarks manually to the required pages. In this light, there is a need for improved methods and systems to address the above-mentioned problems.

SUMMARY

According to aspects illustrated herein, there is a method for allowing a user to add one or more bookmarks while scanning a document. The method includes receiving a document from a user for scanning. A user interface is provided to the user to select an option to add one or more bookmarks to the document. The document is scanned resulting in scanned pages of the document. Based on the selection of the option by the user, the one or more bookmarks are added to one or more scanned pages of the document, where the added bookmarks indicate a pre-defined actionable for one or more recipients. Subsequently, the scanned document including the one or more bookmarked pages is sent to the one or more recipients for the desired action.

According to further aspects illustrated herein, a multi-function device for allowing a user to add one or more bookmarks while scanning a document is disclosed. The multi-function device includes a receiver for receiving a document from a user for scanning. A user interface is provided for allowing the user to select an option to add one or more bookmarks to the document. A scanner scans the document resulting in scanned pages of the document. A controller is provided that adds one or more bookmarks to one or more scanned pages of the document, based on the selection of the option by the user. The one or more added bookmarks indicate a pre-defined action to be taken by one or more recipients. The controller also sends the scanned document including the one or more bookmarked pages to the one or more recipients for the desired action.

According to furthermore aspects illustrated herein, a non-transitory computer-readable medium including instructions executable by a processing resource is included to: receiving a document from a user for scanning; providing a user interface to the user to select an option to add one or more bookmark to the document; scanning the document resulting in scanned pages of the document; based on the selection of the option by the user, adding the one or more bookmarks to one or more scanned pages of the document, where the one or more added bookmarks indicate a pre-defined actionable for one or more recipients; and sending the scanned document comprising the one or more bookmarked pages to the one or more recipients for the desired action.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 3A-3G are exemplary snapshots illustrating implementation of the present disclosure.

FIGS. 4A-4E are exemplary snapshots illustrating another implementation of the present disclosure.

DESCRIPTION

Figure 1:
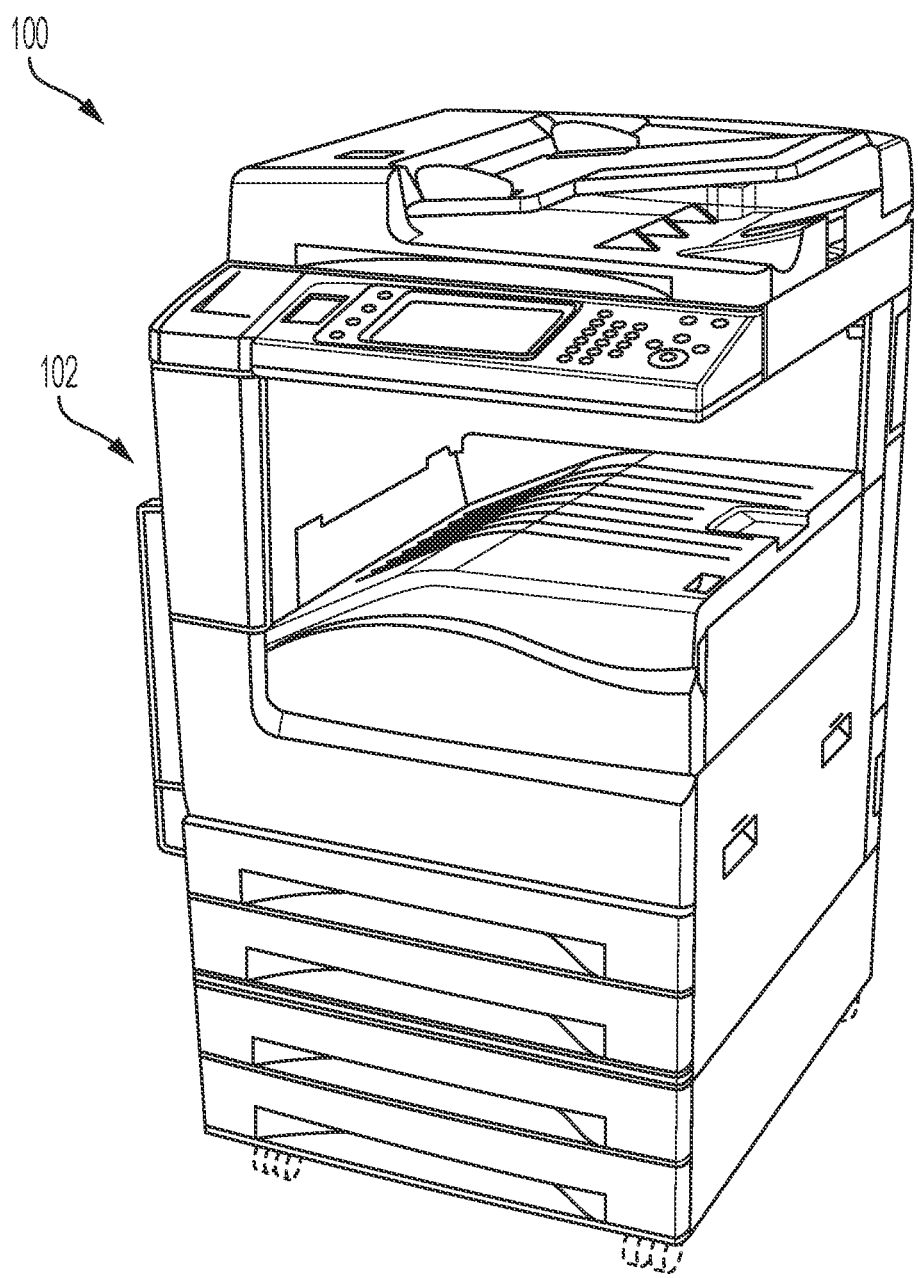
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, imaging, or the like. The multi-function device may include software, hardware, firmware, and a combination thereof. In the context of the current disclosure, the multi-function device allows a user to add one or more bookmarks to a document while scanning the document. The multi-function device specifically, adds bookmarks to one or more scanned pages of the document. Once added, the multi-function device allows the user to send the scanned document including bookmarks to one or more recipients for a desired action.

The term "document" refers to a document having one or more pages. The document is submitted for scanning at the multi-function device by a user. In context of the current disclosure the document is a pre-printed or a physical document that is submitted at the multi-function device for scanning.

The term "scanned document" refers to an output scanned document including one or more bookmarked pages. In context of the present disclosure, the user sends the scanned document having the bookmarked pages to one or more recipients for a desired action. For example, if a user scans a 10-page document, he can add bookmarks on scanned page numbers 2 and 3 to generate a scanned document having bookmarks added on page numbers 2 and 3. Subsequently, the user can send the scanned document to the desired recipients.

The term "bookmark" refers to a mark or a symbol that can be added to one or more scanned pages of the document while scanning the document. The bookmarks are added to indicate a pre-defined actionable for one or more recipients or may be added to draw attention of the one or more recipients. For example, a bookmark can be added to page number 2 of a 10-page document to indicate a recipient to sign the page number 2 of the document. The bookmark may also include a note that defines a pre-defined actionable for the recipient. The note may include a message for the one or more recipients, for example, 'Please add date under the signature', here the message indicates the recipient of the document to mention the current date under his signature, when he signs the document. In context of the current disclosure, one or more bookmarks can be added to a scanning document based on user's input. For example, a user may input a keyword such that scanned pages including the inputted keywords are bookmarked. In other examples, bookmarks can be added to pages including a highlighted text, bookmarks can be added to the pages preceding and/or succeeding a blank page in the document, bookmarks can be added to pages including one or more user specified keywords, etc.

The term "user" refers to a user who sends the scanned document to the one or more recipients and the term "recipient" refers to one or more users who receives the scanned document including the one or more bookmarks. In context of the present disclosure, the recipient receives the scanned document including one or more bookmarks via email. The recipient takes the desired action based on the one or more bookmarked pages and may return the scanned document to the user. In some instances, the recipient may take print-out of the scanned document and takes the desired action on the printed version of the document. For example, if a bookmark requests the recipient to sign the received scanned document, the recipient may first print the document and then signs the document. Subsequently, the recipient may manually share either the printed signed version of the document with the user or may scan the signed document to share the document via email. In some cases, the user and the one or more recipients may be the same. For example, the user may scan the document and bookmark one or more pages and share the scanned document on his email address for later usage.

The term "actionable" refers to any portion of a document or image including, but not limited to, a mark, word, phrase, or symbol that can be recognized and interpreted by a computer program including, but not limited to, a program using artificial intelligence for requiring or recommending an action from a user or recipient.

The terms "highlighting" or "highlighted" refer to any way that can be used to visually enhance a portion of content in the document. Examples of highlighting can include standard forms of highlighting available in word-processing programs, as well as bolding, underlining, italicizing, selection of font or color, and so on. In context of the present disclosure, user can highlight required content in the physical document and then select an option of adding bookmarks to pages including the highlighted content.

Overview

The present disclosure discloses methods and systems to add one or more bookmarks to a document while scanning the document. The methods and systems allow addition of one or more bookmarks to one or more pages of the document based on user's input. For example, the user can select one or more pages where he wishes to add the bookmarks in the document, the user can add bookmarks based on keywords, blank pages, highlighted text in the document, and so on. Unlike conventional methods and systems, the user is not required to first send the scanned document to different computing device for addition of one or more bookmarks, instead the bookmarks can be added at the multi-function device itself while scanning the document. Therefore, the present disclosure provides an easy and automated approach to add bookmarks to the document, while the document is getting scanned at the multi-function device.

The methods and systems provide a preview of the one or more pages having the one or more bookmarks added, for user's confirmation. The user can preview the document and can add one or more additional bookmarks or can delete one or more bookmarks while reviewing the one or more pages of the document. For example, if a user is scanning a 10-page document, he can preview all the 10 scanned pages and selects one or more pages where he wishes to add the one or more bookmarks. The bookmarks can be a symbol either alone or along with a note. For example, the user may add a bookmark on page number 5 along with a note "please sign here and also mention current date". This way the present disclosure saves user's time and effort in adding one or more bookmarks in a document while scanning the document.

Exemplary Environment

FIG. 1 shows an exemplary environment 100 in which various embodiments of the disclosure can be practiced. The environment 100 includes a multi-function device 102. Various examples of the multi-function device 102 may be a printer, a scanner, a multi-function peripheral device, or the like. The multi-function device 102 provides one or more functionalities such as printing, scanning, imaging, copying, and so on. In context of the present disclosure, the multi-function device 102 allows a user to add one or more bookmarks to a document while scanning the document. The multi-function device 102 allows the user to select one or more pages of the document where the user wishes to add the one or more bookmarks.

In operation, a user who wishes to add one or more bookmarks to a document submits the document at the multi-function device 102 for scanning. Once submitted, the multi-function device 102 provides an option to add one or more bookmarks to the document. The user then selects the option to add one or more bookmarks to the document. Once the user selects the bookmarking option, the user is provided with various options based on which one or more bookmarks can be added in the document. Exemplary options may include—bookmark based on page numbers, bookmark based on keywords, bookmark based on blank pages, bookmark based on highlighted content, and so on. The user can select the option of his choice. Based on the selected option, the user provides his input to select one or more pages of the document where he wishes to add the one or more bookmarks in the document. For example, if the option selected by the user is bookmarking based on page numbers, the user inputs the page numbers that are to be bookmarked. Based on the input provided by the user, the multi-function device 102 identifies the corresponding one or more pages of the document where the bookmarks are to be added. Subsequently, the multi-function device 102 provides a preview of the identified pages such that the user can add one or more bookmarks on the pages. In some cases, the multi-function device 102 automatically adds one or more bookmarks to pages identified based on user's inputs. Subsequently, a scanned document including the one or more bookmarks added to the one or more pages is generated. The user can then send the scanned document to one or more recipients for a pre-defined or desired action.

For example, a user may add a bookmark on page number 2 while scanning a 10-page document. The bookmark on page number 2 may be added to get 'signature' of one or more recipients to whom the scanned document is to be sent. The added bookmark includes a symbol that indicates to the recipient about the desired action i.e., signature. The addition of the bookmark may include adding a note defining details of the pre-defined action. For example, the added bookmark includes a symbol along with a note such as 'please add date and name while signing the document' to specify the details pertaining to the desired action. This way, the multi-function device 102 allows addition of one or more bookmarks to one or more scanned pages of a document while scanning the document and further allows the user to send the bookmarked scanned document to one or more users/recipients for the desired action.

Exemplary Multi-Function Device

Figure 2:
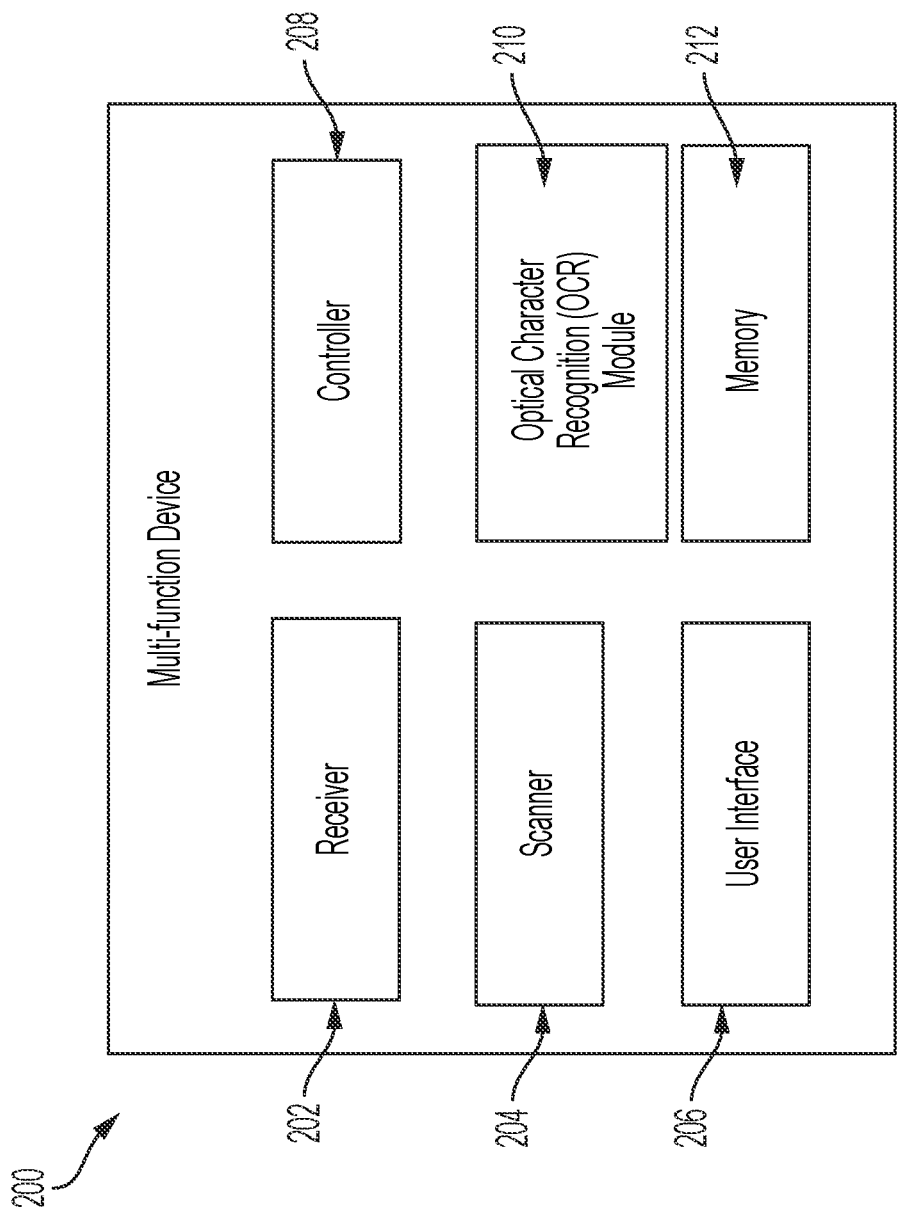
FIG. 2 is a block diagram illustrating a multi-function device and its components, in accordance with an embodiment of the present disclosure.

FIG. 2 is a block diagram illustrating various components of a multi-function device 200 for implementing the current disclosure. As shown, the multi-function device 200 includes a receiver 202, a scanner 204, a user interface 206, a controller 208, an Optical Character Recognition (OCR) module 210, and a memory 212. The components 202-212 are connected to each other via a conventional bus or a later developed protocol. And the components 202-212 communicate with each other for performing various functions of the present disclosure. The multi-function device 200 may further include additional component(s) as required to implement the present disclosure. Also, the multi-function device 200 may perform functions and operations similar to the multi-function device 102 of FIG. 1.

The implementation begins when a user wishes to scan a document having one or more pages. While scanning, the user wants to add one or more bookmarks to one or more scanned pages of the document and sends the scanned document to one or more recipients for a desired action. The user submits the document at the multi-function device 200 for scanning. Upon submission, the receiver 202 receives the document. The receiver 202 can include any automatic document feeder (ADH) or a manual document feeder such as a platen. In one example, the receiver 202 can be Duplex Automatic Document Feeder (DADH) that receives the document and automatically feeds the document to the scanner 204 when the scanning is initiated. Those skilled in the art will appreciate that other types of receiver 202 can also be used without departing from the scope of the present disclosure. One exemplary scenario is shown in a snapshot 300 of FIG. 3A, where user 302 wishes to send a printed document 304 to a recipient via email. So, the user places the document 304 on a platen 306 of a multi-function device 308 for scanning.

Figure 3B:
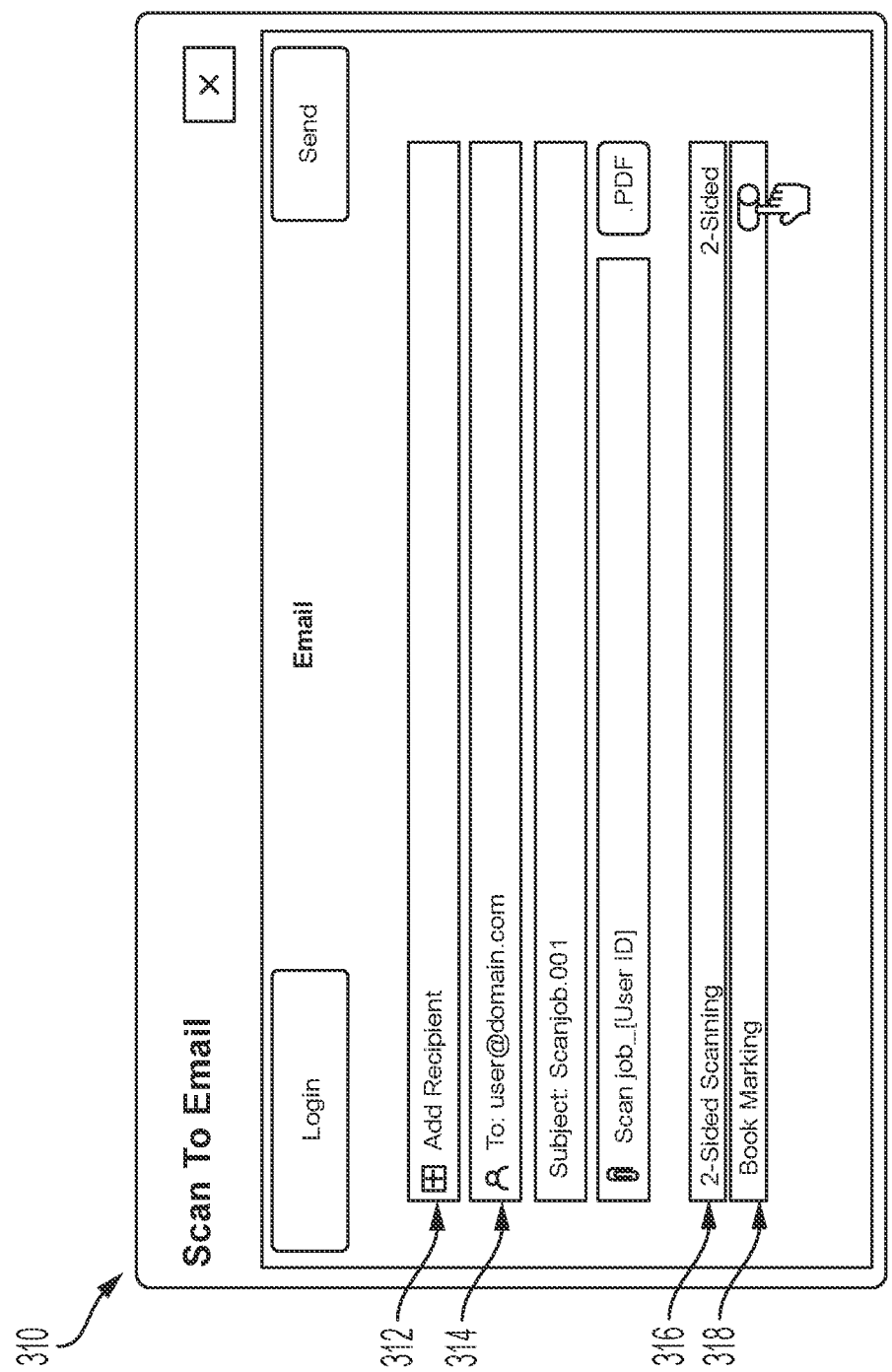

Once the document is received, the user submits a scan command via the user interface 206. Once submitted, the user interface 206 displays various scan options to the user for his selection. Exemplary scan options can be single/double-sided scanning, orientation of scan, resolution, and the like. In context of the current disclosure, the user interface 206 displays option "bookmarking" for user's selection. The user selects the "bookmarking" option to add one or more bookmarks to one or more pages of the document, while scanning the document. One exemplary user interface 310 including such option is shown in FIG. 3B. As illustrated, the user interface 310 displays a 'Scan to Email' workflow that can be used by a user (who is scanning a document) to send a scanned document to one or more email recipients. The user interface 310 includes an option to add recipients (marked as 312) along with one or more scan options such as '2-sided scanning' (marked as 316) and 'Bookmarking' option (marked as 318). As shown, the user adds a recipient's email address 'user@domain.com' (marked as 314) to whom the scanned document is to be sent. The user can add any number of email recipients as required. This user interface 310 including the option of adding recipients can be shown post scanning the document as well. Further, the user selects the 'Bookmarking' option 318 to add one or more bookmarks to one or more pages of the document, while scanning the document. The user can turn the bookmarking option 'ON' or 'OFF' based on his requirements. In the shown example, the user slides the bookmarking button towards right-hand side to turn 'ON' the option.

Once the user selects the bookmarking option, various options of bookmarking one or more pages of the documents are displayed via the user interface for user's selection. Exemplary options that may be displayed include—bookmark based on preview, bookmark based on page numbers, bookmark based on blank pages, bookmark based on keywords, bookmark based on highlighted content, and so on. The user selects options of his choice.

Subsequently, the scanner 204 initiates the scanning process. The scanner 204 scans the document to generate scanned pages of the document. The scanned pages are the temporary pages that are to be used to add one or more bookmarks to the document. The scanned pages are temporarily stored in the memory 212. The scanned pages are images that are generated by scanning the document. The scanned pages are in any suitable pre-defined format including, but not limited to, .JPEG, .JPG, .PNG, or .TIFF. In context of the current disclosure, the scanned pages are converted to an editable and/or searchable format using an Optical Character Recognition (OCR) module 210.

Figure 3C:
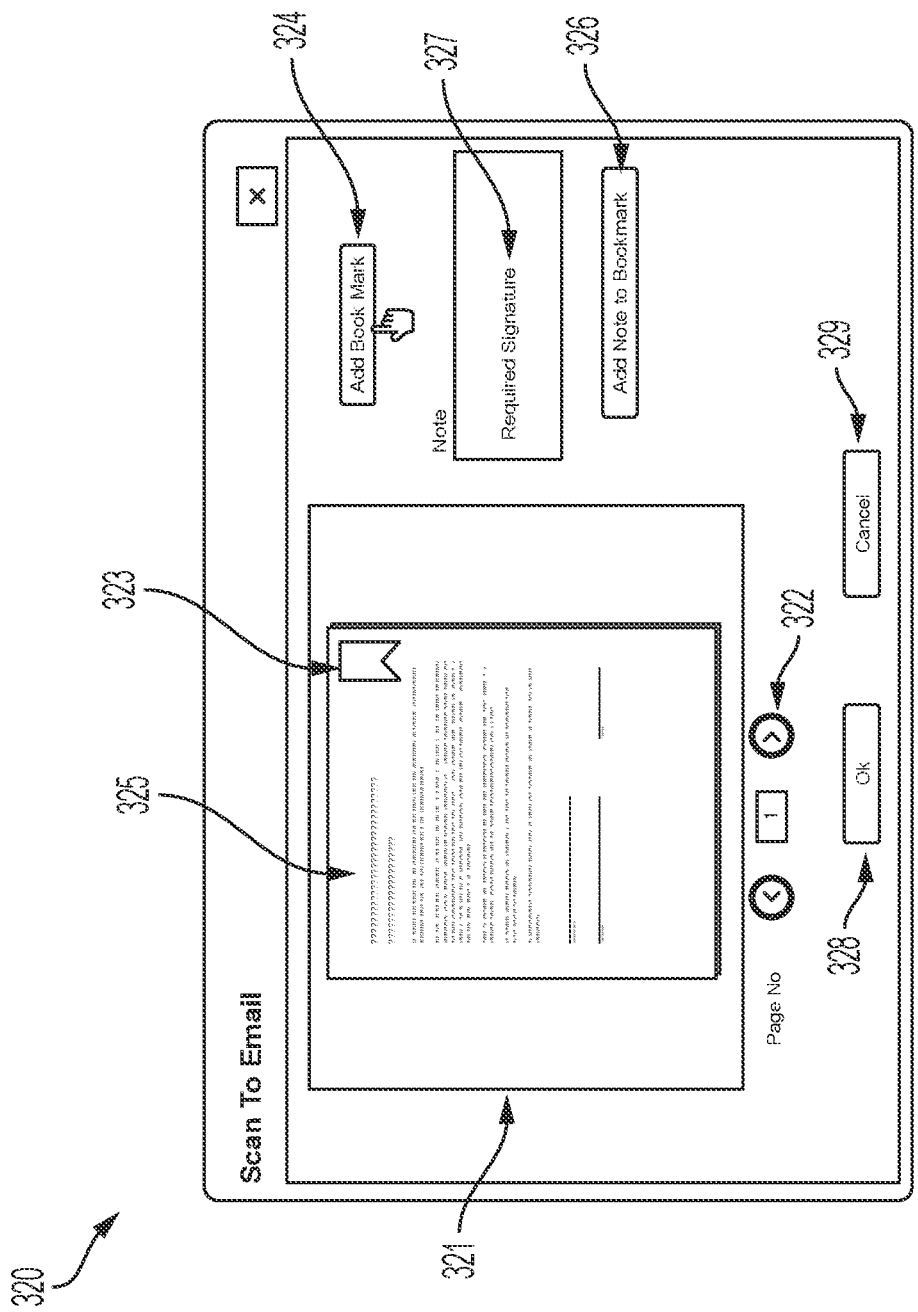
Figure 3D:
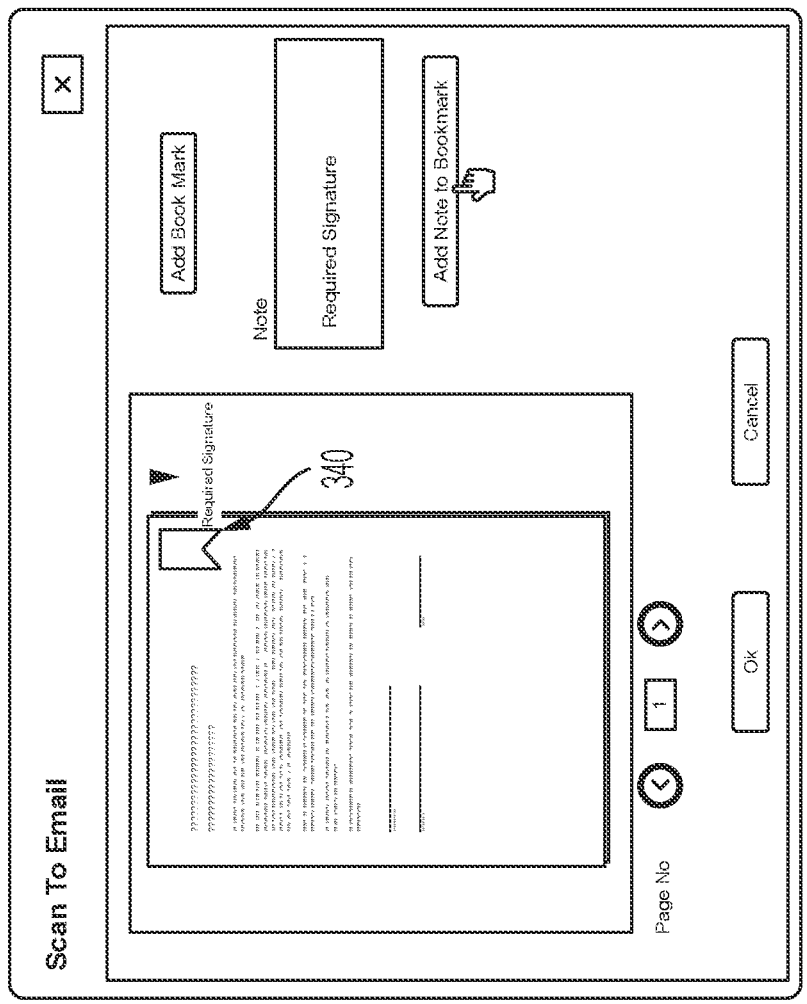

Subsequently, a preview of the scanned pages is displayed to the user via the user interface 206. The preview allows the user to add bookmarks on the pages of his choice. In other words, when the user previews each page, he can provide his inputs to add one or more bookmarks to the pages and can move to the preview of next pages. Based on the user inputs, the controller 208 adds one or more bookmarks to the one or more scanned pages of the document. One exemplary user interface displaying a preview of a scanned page is shown in FIG. 3C. As shown, the user interface 320 displays a preview (marked as 321) of a scanned page (marked as 325). The user interface 320 provides a button 'Add Bookmark' (marked as 324) that can be clicked by the user to add a bookmark, such as bookmark 323 to the scanned page 325. In addition, the user interface 320 provides an option to add a note to the bookmark (marked as 326). The user can click on the option 326 to add note to the added bookmark 323. Here, the bookmark and the note indicate a pre-defined action that can be taken by the one or more recipients of the scanned document. For example, if the user adds bookmark on scanned page 325 to get signature of one of the recipients, the user adds a note 'Required Signature' (marked as 327) that can indicate the recipient that he is required to sign on this page. The note can indicate various other pre-defined actions such as location where the signature is required on the bookmarked page, the note can also include a message indicating that date is also required along with the signature, and so on. The note 327 is displayed to the user when he hovers over the added bookmark 323 (as shown in FIG. 3D as 340). Once the user is done adding the bookmark 323 and the note 327 to the scanned page 325, he can move to the next page by clicking on a forward button 322. The user can also click on 'ok' (marked as 328) if the user wishes to exit the option of adding one or more bookmarks to the scanned document. This may happen when the user is done adding bookmarks to the required scanned pages and now wishes to send the scanned document to one or more recipients. The user interface 320 further provides an option of 'cancel' (marked as 329) to exit the option of adding bookmarks to scanned pages of the document.

Figure 3E:
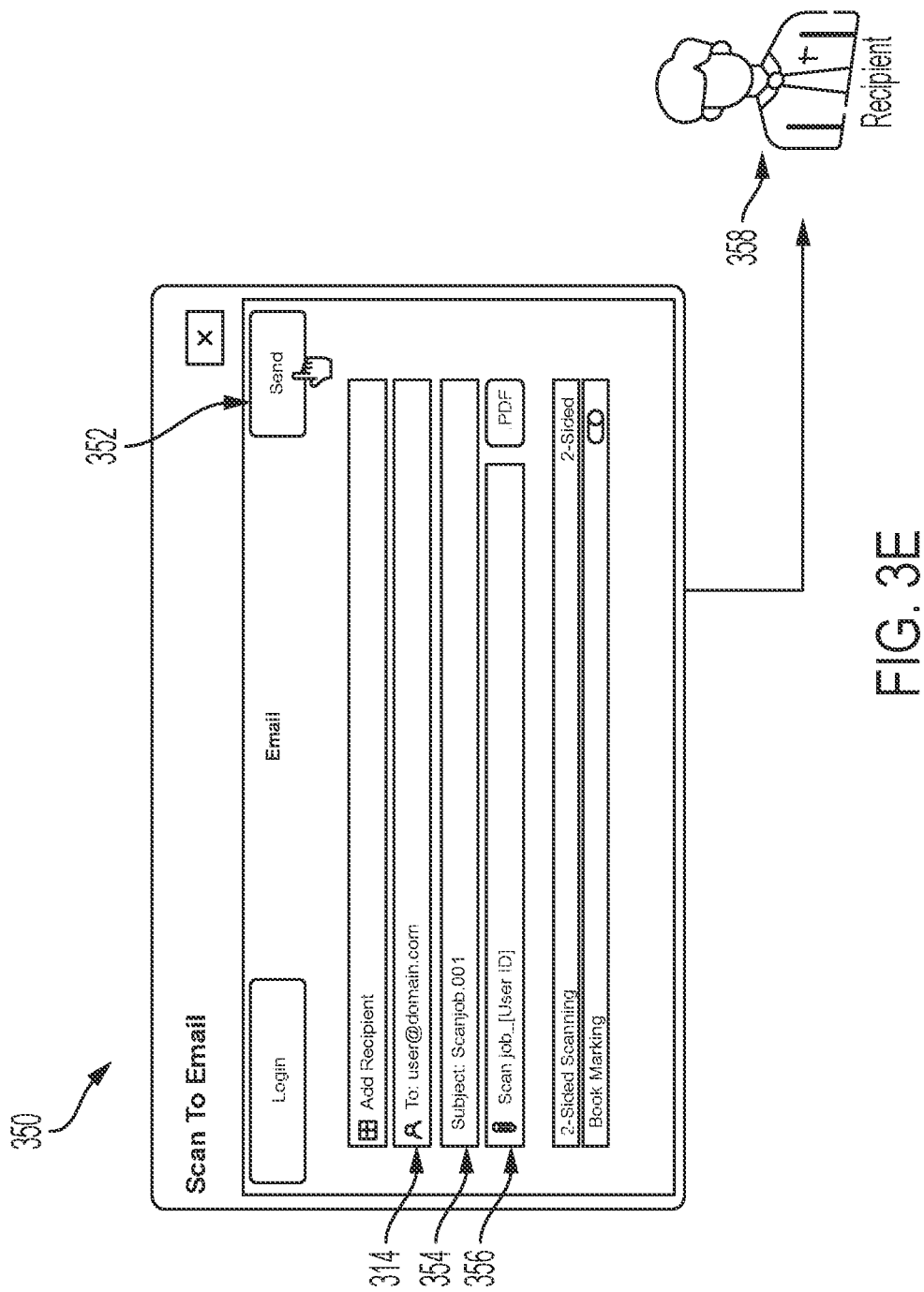

Once the addition of one or more bookmarks is done, the user sends the scanned document to the added one or more recipients. One such exemplary user interface 350 is shown in FIG. 3E. As shown, the user interface 350 includes details related to the scanned document such as the recipient 314 to whom the scanned document is to be sent, subject of the email (marked as 354), and a scanned document (marked as 356) attached to the email. These are just exemplary details and the user interface 350 can include any suitable details pertaining to the scanned document, recipient, etc. that is to be sent to the recipient. Once the details are added, the user clicks on a 'Send' button (marked as 352) to send the scanned document to the listed recipient such as a recipient 358.

Figure 3F:
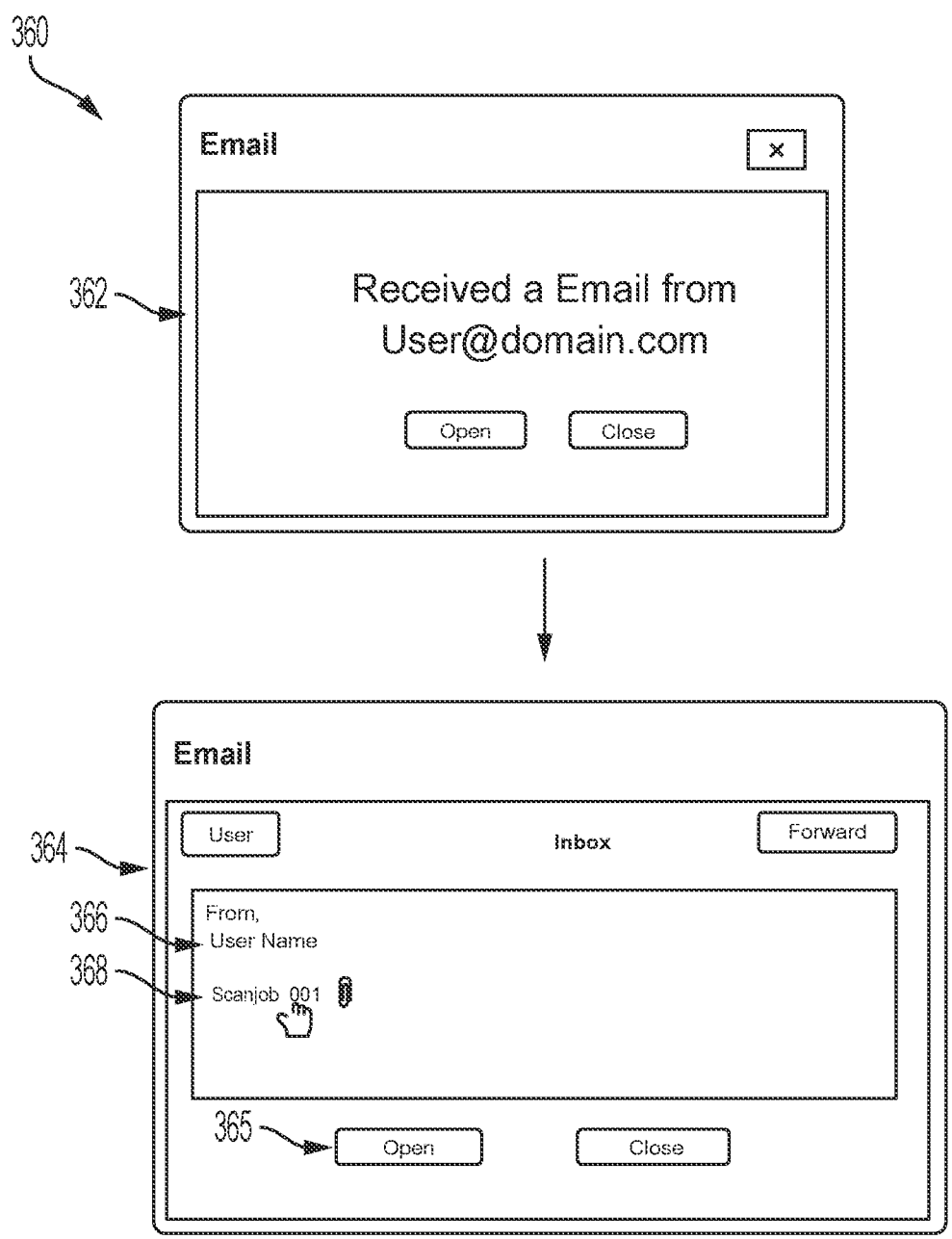
Figure 3G:
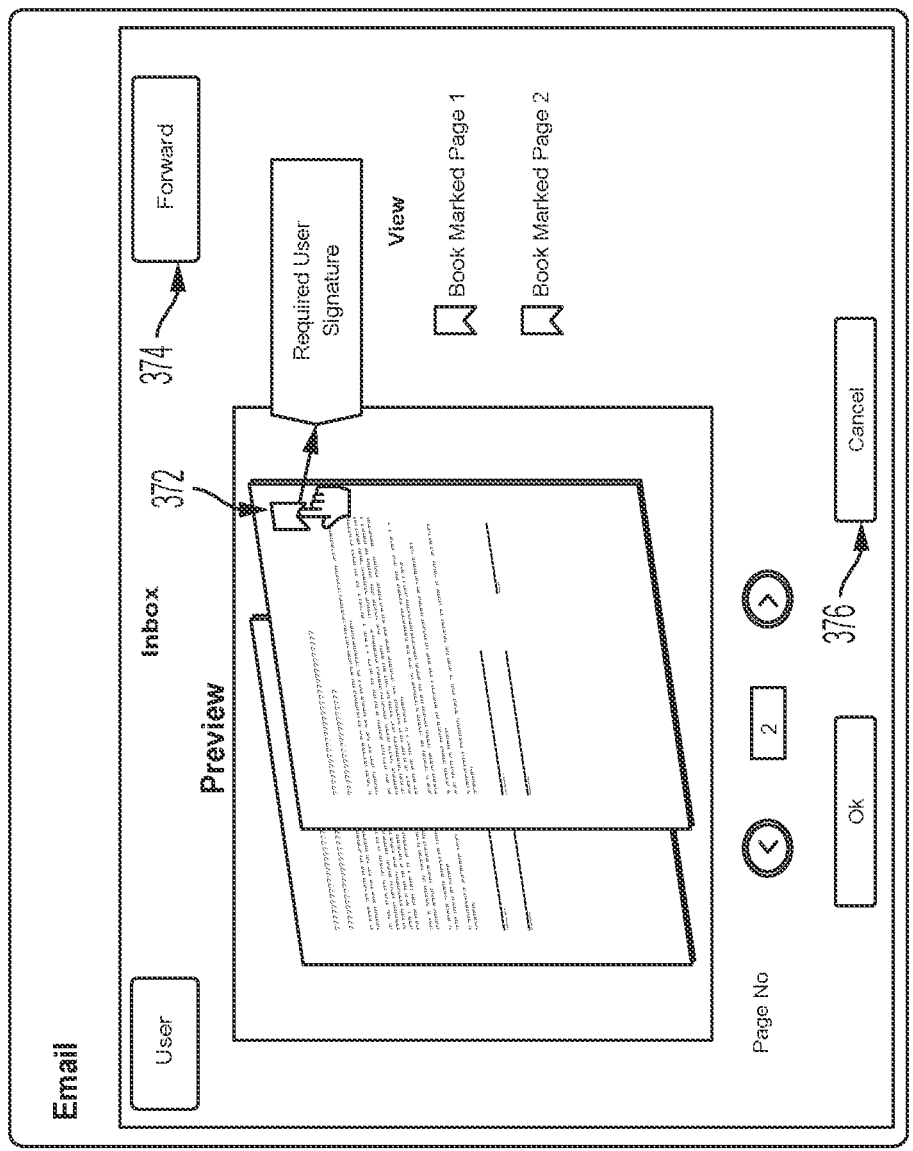

Subsequently, the controller 208 receives the details submitted by the user to send the scanned document to one or more recipients. The controller 208 processes the details and initiates sending of the scanned document including the one or more bookmarked pages to the one or more recipients. Subsequently, the recipient receives the email sent by the user. One exemplary snapshot 360 where a recipient receives such an email is shown in FIG. 3F. As shown, the recipient receives a notification (marked as 362) including a message that informs him about an email that is received in his email account 'user@domain.com'. The recipient opens his emails or inbox (marked as 364) to check details of the received email. Upon opening, the inbox 364 indicates that the email is received from a user named as 'Username' (marked as 366) and includes an attachment 'Scanjob001' (marked as 368). The attachment 368 includes the scanned document with the one or more bookmarked pages, as described above. The recipient may open the scanned document either by double clicking on the attachment 368 or by clicking on 'Open' (marked as 365). Upon opening, the recipient may refer to the added bookmarks to take a desired action. For instance, as shown in FIG. 3G, once the recipient opens the scanned document, the added bookmark 372 indicates to the recipient that page number 2 is bookmarked, and he further notices that he is requested to sign the page when he hovers over the bookmarked symbol. The recipient signs page number 2 and moves to next pages. Based on availability of bookmarks on remaining pages, the recipient takes desired action. For example, the recipient signs the other pages having bookmark requesting recipient's signature. Once the recipient signs the bookmarked pages, he may forward the signed document back to the user (i.e., the sender). The recipient clicks on forward button (marked as 374) to send the signed document back to the user/sender. The recipient may exit the document by clicking on 'cancel' (marked as 376). While the recipient signs the received scanned document in the e-copy, it can be considered that the recipient may first print the scanned document and signs the document based on added bookmarks. Once signed, the recipient may share either the printed version of the signed document with the user or may scan and send a digital version of the signed document.

In the present disclosure, the memory 212 stores all relevant information required for implementing the current disclosure. For example, the memory 212 temporarily stores the inputs provided by the user to add one or more bookmarks to one or more pages, notes added to one or more scanned pages of the document, and so on. Any details stored in the memory 212 may be retrieved by the controller 208, OCR module 210 or other components for implementing the current disclosure.

FIG. 2 is explained with respect to a scenario in which the user previews the scanned pages of the document to add one or more bookmarks to the one or more scanned pages of the document. In the discussed scenario, all the scanned pages of the document are displayed to the user such that the user can preview one or more scanned pages and select pages where he wishes to add the one or more bookmarks. In the discussed scenario, the user manually previews the scanned pages to add bookmarks to the pages of his choice. However, there can be a scenario where the user wishes to add one or more bookmarks to the document in an automated way. In such cases, the user is required to input specific page numbers, page ranges where the bookmarks are to be added. This way, the bookmarks are added to the specified pages and user is shown preview of the bookmarked pages for his confirmation. In another cases, the user may input one or more keywords based on which the bookmarks are added to one or more scanned pages of the document. For example, if user wishes to add bookmark on pages where a signature of a recipient is required, he may input a keyword 'sign' and/or 'signature' and pages including these keywords are automatically bookmarked by the multi-function device 200. In some cases, upon inputting the keywords, the controller 208 searches the one or more pages including the user specified keyword(s) and a preview of these pages are shown to the user such that the user can add bookmarks to one or more pages of his choice. While previewing the pages identified to include the keywords, the user can also change the one or more keywords to further get an updated set of pages. Further, in some examples, the multi-function device 200 may provide an option to bookmark pages excluding one or more keywords as specified by the user. In another scenario, a blank page may be inserted between a set of pages of the document such that a page after and/or before the blank page can be bookmarked by the multi-function device 200. In yet another scenario, the user may highlight some text portions in the document and provide input to the multi-function device to add bookmark to pages having highlighted text. More details related to these scenarios or embodiments of adding bookmarks to the scanned pages of the document are discussed in conjunction with FIGS. 4A-4E and FIGS. 5-6 below. These are just a few instances and various ways can be used to add bookmarks while scanning the document, without departing from the scope of present disclosure.

In the above listed examples, once the scanned pages of the document are generated, the OCR module 210 first converts the scanned pages to editable and/or searchable format. Subsequently, the controller 208 adds one or more bookmarks to one or more pages of the document based on user's input. For example, if the user provides an input to add bookmark to pages including a keyword 'client confidential', the controller 208 searches the scanned pages to identify one or more scanned pages including the keywords. The controller 208 then provides preview of the pages and based on user's input adds bookmark to the one or more pages. In another example, if the user provided his input to add bookmark on selected number of pages, the controller 208 searches the input page numbers, shows preview of one or more identified pages, and based on user's selection adds bookmarks to the selected one or more pages. Similarly, based on various other types of user inputs, the controller 208 identifies one or more scanned pages and adds bookmarks to the identified one or more scanned pages based on user's selection. In some cases, the bookmarks are automatically added to the pages that are identified for bookmarking based on user's input. And the preview is shown to the user for his confirmation on the added bookmarked pages. At this stage, the user can add or delete one or more bookmarks and can also add note defining a desired action. The preview ensures accuracy of the added bookmarks by previewing the scanned pages before sending the scanned document to one or more recipients.

Exemplary Snapshots

FIGS. 4A-4E are snapshots of an exemplary implementation of the present disclosure. In this exemplary implementation, the user adds one or more bookmarks to a scanning document based on one or more keywords. As discussed above, the user first submits a document having one or more pages at a multi-function device for scanning. The multi-function device can be same as that of the multi-function device 102 or 200 as discussed in FIGS. 1 and 2, respectively.

Figure 4A:
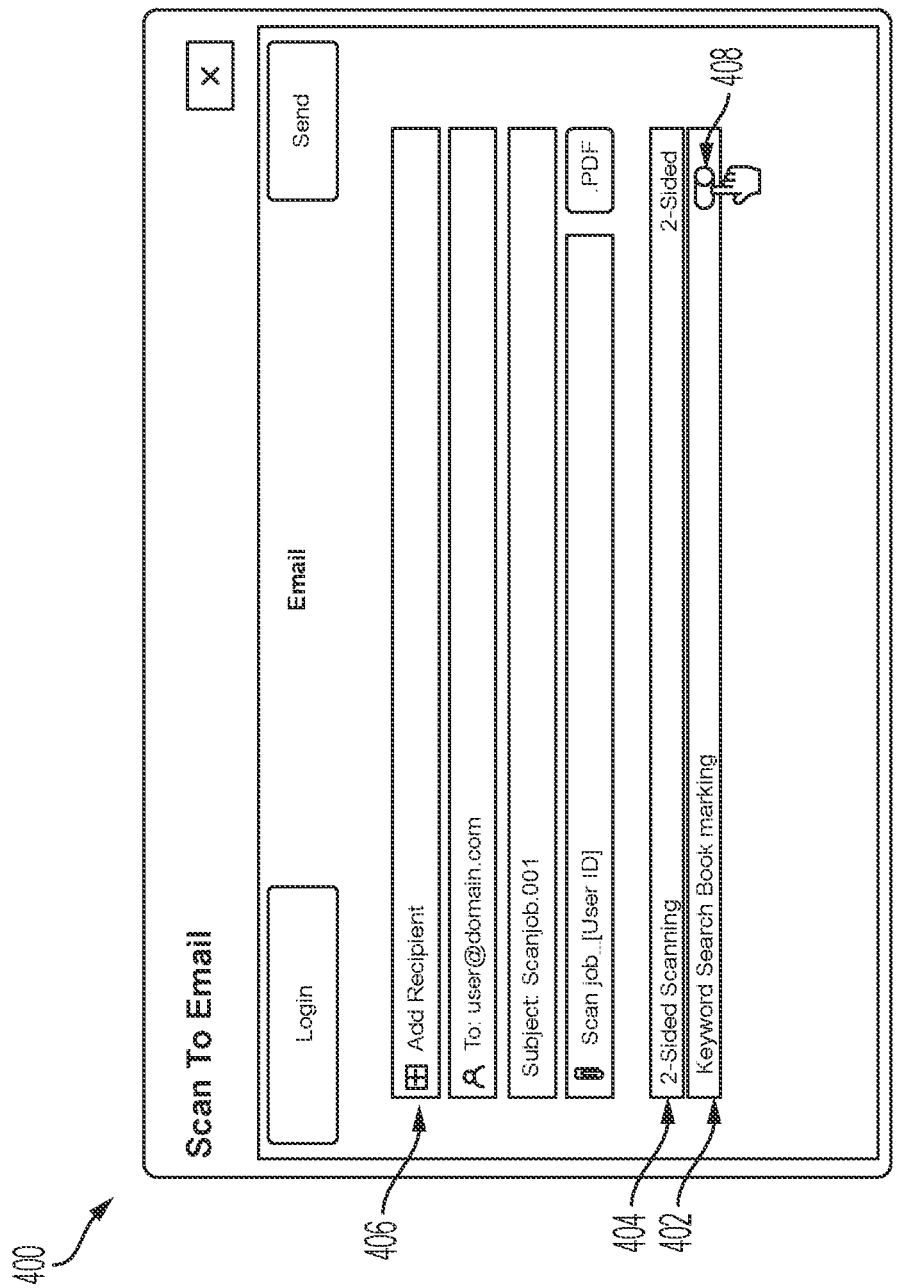

Once the document is submitted, the user submits a scan request. Subsequently, a user interface including various scan related options are displayed to the user for selection. One such exemplary user interface 400 is shown in FIG. 4A. The user interface 400 provides an option of 'Keyword based Bookmarking' (marked as 402) and the user uses a sliding button (marked as 408) to turn ON the option 402. The user slides the button towards right-hand side to turn the option ON (shown as 408 in FIG. 4A). Along with this, the user can select other scan related options such as '2-sided scanning' (marked as 404), etc. The user may also add email addresses of one or more recipients (marked as 406) to whom he wishes to send the bookmarked scanned document.

Figure 4B:
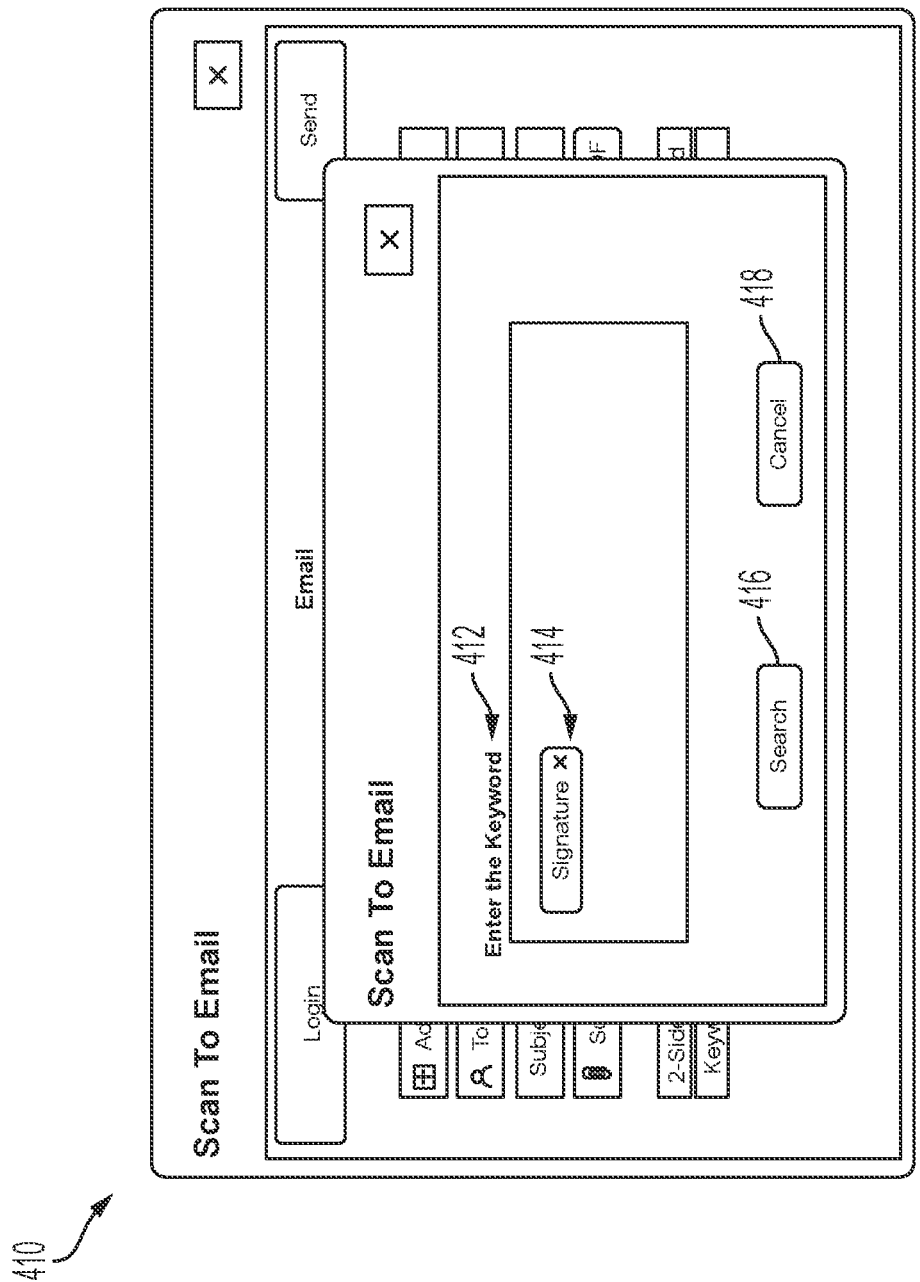
Figure 4D:
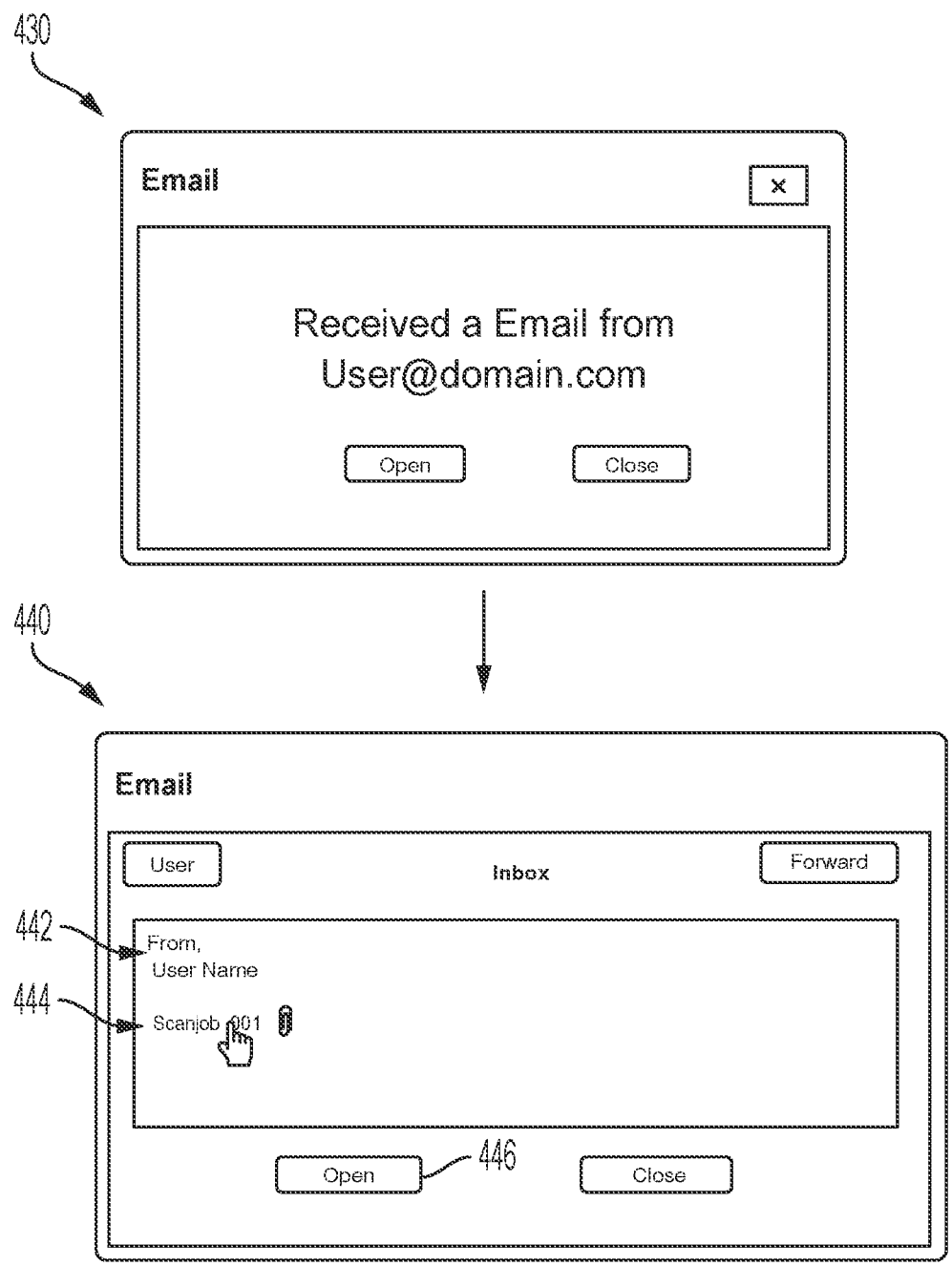
Figure 4E:
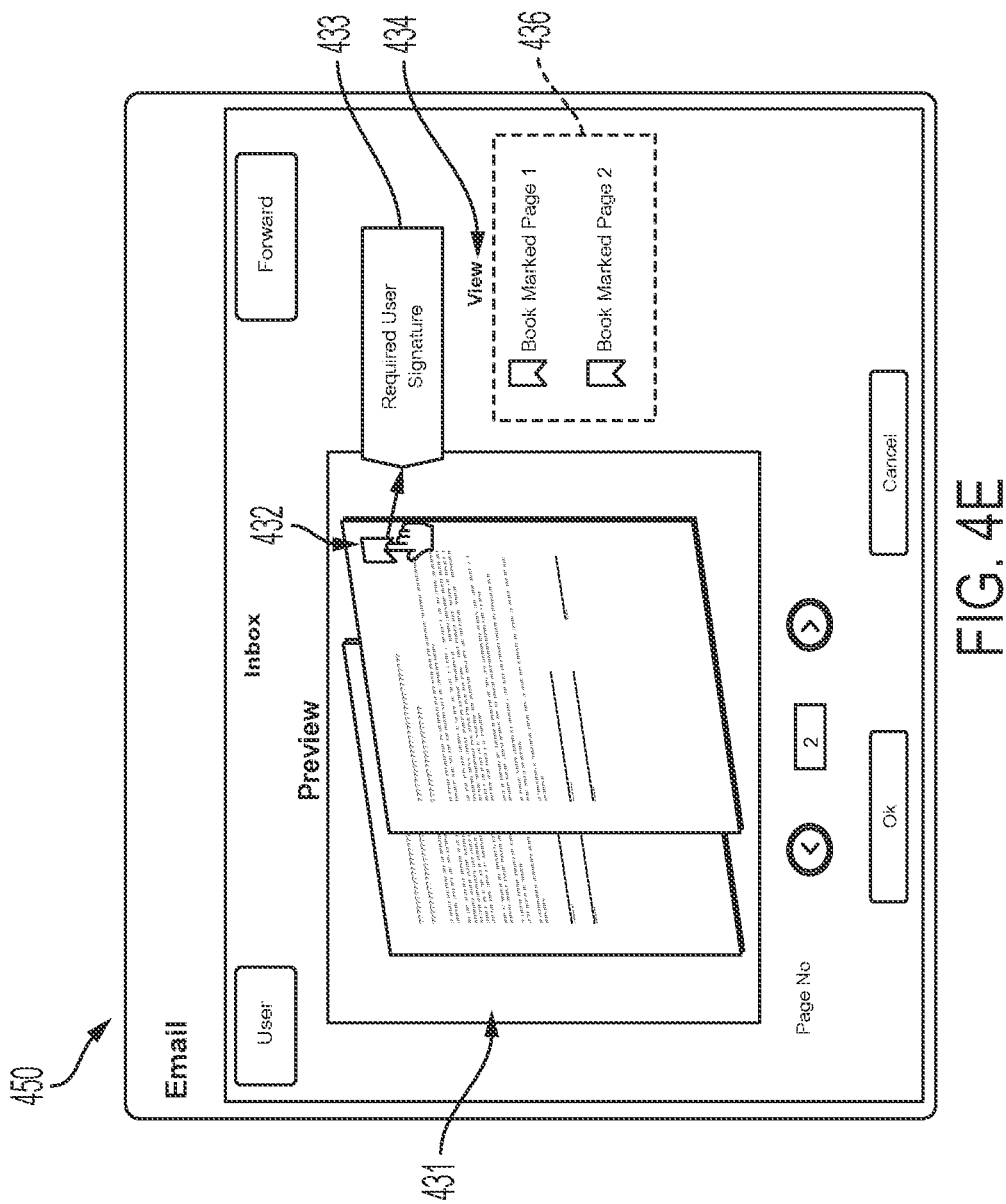

Upon selecting the keyword based bookmarking option 402, another user interface is displayed to the user that allows him to input one or more keywords. One such exemplary user interface 410 is shown in FIG. 4B. As shown, the user can input one or more keywords under a field 'enter the keyword' (marked as 412). Here, one keyword inputted by the user is 'Signature' (marked as 414). Any suitable number of keywords can be added by the user. The keywords can include text, numbers, alphanumeric text, symbols, and so on. Also, while not shown, the user interface 410 may also provide an option that can be selected by the user to identify pages including all the keywords, at least one of the keywords, excluding the keywords, and so on. Once selected, the user submits the keywords for searching (marked as 416). The user can exit the user interface 410 any time by clicking on 'cancel' (marked as 418).

Subsequently, the controller (such as controller 208 of FIG. 2) of the multi-function device searches the scanned pages for the input keyword 'Signature' 414. The controller automatically adds bookmark on the pages having the keyword 'Signature' 414. Subsequently, a user interface showing preview of the bookmarked pages is provided to the user. The preview includes scanned pages that are identified to include the input keyword 'Signature'. One such exemplary user interface is shown in FIG. 4C. The user interface 420 displays a preview 422 of the scanned page number 2 having a bookmark 421 added towards a top right corner of the scanned page. The user interface 420 also provides an option to add or remove keywords (marked as 424) based on which bookmarking of pages can be dynamically changed. For example, if the user wishes to bookmark additional pages including a keyword 'agreement', the user inputs the keyword 'agreement' in a blank box 423 and click on 'Apply' button (marked as 425). Based on this, the controller searches the scanned pages to identify pages including the keyword 'agreement'. The identified pages are bookmarked, and preview of the pages is displayed for user's review and confirmation. The user can now check the preview of pages that are bookmarked and can confirm if he wishes to bookmark all the pages shown in the preview. The user can anytime change the keywords by either adding new keywords or removing the existing keywords in the box 423. As a result, the number of scanned pages that are bookmarked dynamically changes and are displayed to the user. Further, the user interface 420 provides an option to add notes (marked as 426) to the added bookmarks. The bookmark along with the note indicates a pre-defined action that a recipient needs to take upon receiving the scanned document having one or more bookmarks. For example, if the user added the bookmark 421 so that the recipient signs the scanned pages that are bookmarked, the user can add a note in a blank box (marked as 427) describing the action to be taken by the recipient. For instance, in FIG. 4C, the note added in the box 427 is 'Required Signature' that indicates the recipient that he is required to sign page number 2. Similarly, the user can add notes to other bookmarks too. A note added along with a bookmark may be similar or different to the other notes added to the other bookmarks in the scanned document. Once the user adds the bookmark and note to the page number, he can click on a forward button (marked as 428) to preview the other pages that are identified to include the keyword 'Signature'. The user may click on 'Ok' (marked as 429) once bookmarks and notes are added on desired pages.

As discussed previously, the user sends the scanned document having one or more bookmarks to one or more recipients for a pre-defined action. Once the one or more recipient receives the scanned document, a notification may be received informing the recipients about the received email (shown as 430 in FIG. 4D). The recipients then access their mailbox to open the received email (shown as 440 in FIG. 4D). The email includes details such as 'Username' (marked as 442) who sent the email and name of the attached document 'Scanjob 001' (marked as 444). The recipient can click on the attachment to open the document or may click on 'open' (marked as 446) to access the scanned document. The recipient can open the document in a preview mode (shown as 450 in FIG. 4E). As shown, the preview mode 450 shows preview of bookmarked pages (marked as 431) such that the recipient can check all the bookmarked pages. The recipient can hover over an added bookmark 432 to see details related to the symbol/bookmark 432. Upon placing the cursor on 432, a note 'Required User Signature' (marked as 433) is displayed to the recipient. The preview mode 450 also provides an option to view (marked as 434) a list of bookmarked pages (marked as 436). The list 436 indicates that page number 1 and 2 are bookmarked in the received scanned document. The list may be hyperlinked to the respective pages such that the recipient may click on 'Bookmarked Page 1' to open page number 1 in the preview 431 and may click on 'Bookmarked Page 2' to open page number 2 in the preview 431.

Figure 5:
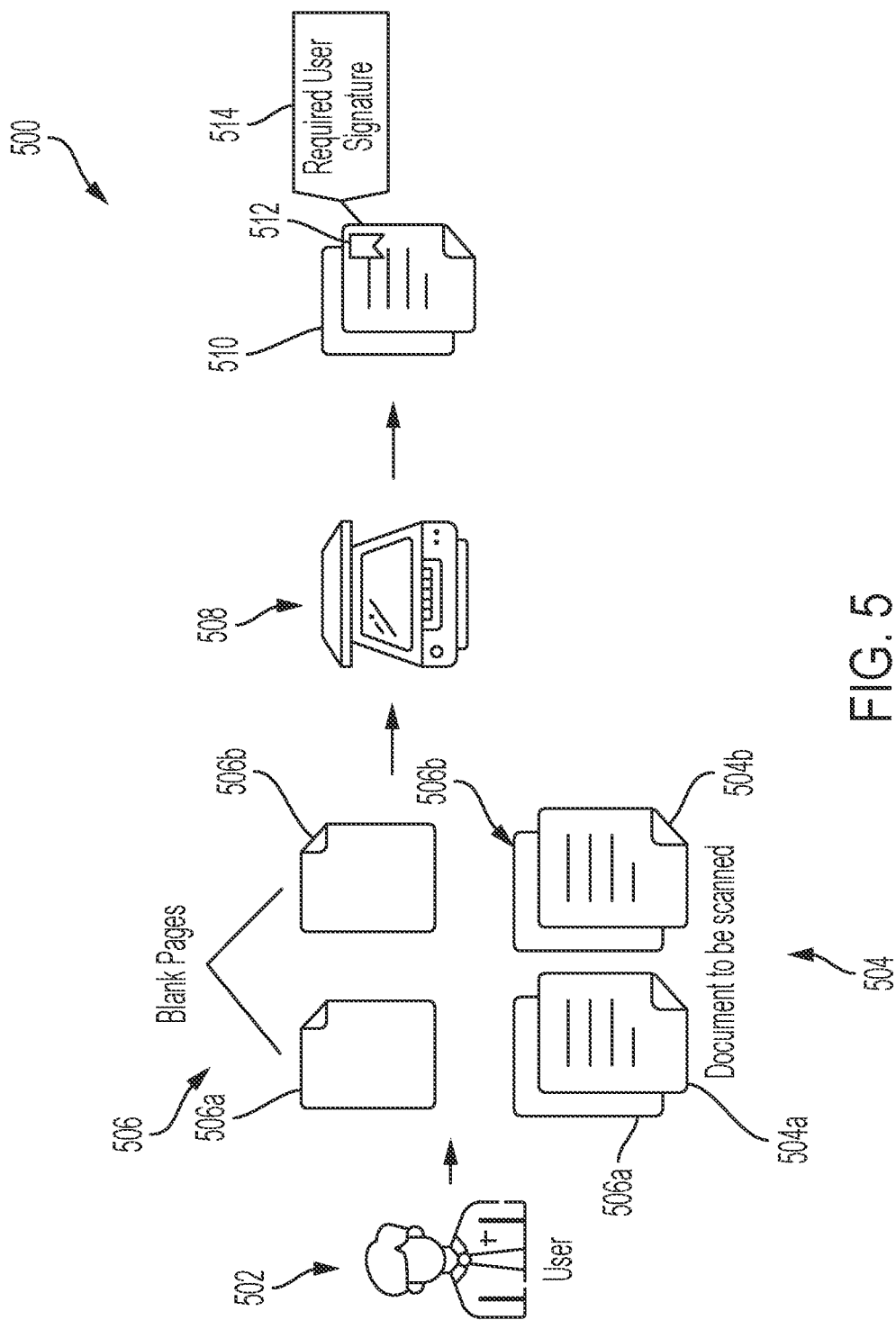
FIG. 5 is an exemplary snapshot illustrating additional implementation of the present disclosure.

FIG. 5 illustrates another exemplary implementation 500 of the present disclosure. The implementation 500 allows addition of one or more bookmarks to a scanning document based on blank pages. As shown, a user 502 wishes to scan a document 504 including two pages 504a and 504b. According to the implementation 500, the user wishes to add bookmark on both the pages of the document 504. He adds a blank page 506a after the first page 504a and a blank page 506b after the second page 504b. Once the blank pages 506a and 506b (collectively, 506) are inserted in the document 504, the user 502 submits the document 504 for scanning at a multi-function device 508. While submitting the document 504, the user 502 selects an option to add bookmarks based on availability of blank pages. In particular, the user 502 provides input to bookmark the pages having a blank page after the pages. Once the input is provided, the multi-function device 508 initiates scanning. As a result, an output scanned document 510 is obtained having bookmarks added to the corresponding pages. For the sake of clarity, the bookmark 512 is shown on one page, however, it can be considered that the other page of the document is also bookmarked based on the users input. Further, as shown, the user 502 added a note (marked as 514) to the bookmark 512 such that a recipient can see the note 514 when he hovers over the bookmark 512.

While the implementation 500 is discussed where the blank pages are inserted after the pages that are to be bookmarked, the implementation 500 also allows bookmarking of pages having blank pages inserted/placed before the pages that are to be bookmarked. In addition, the bookmark can be added to pages having blank page placed either before or after the pages.

Figure 6:
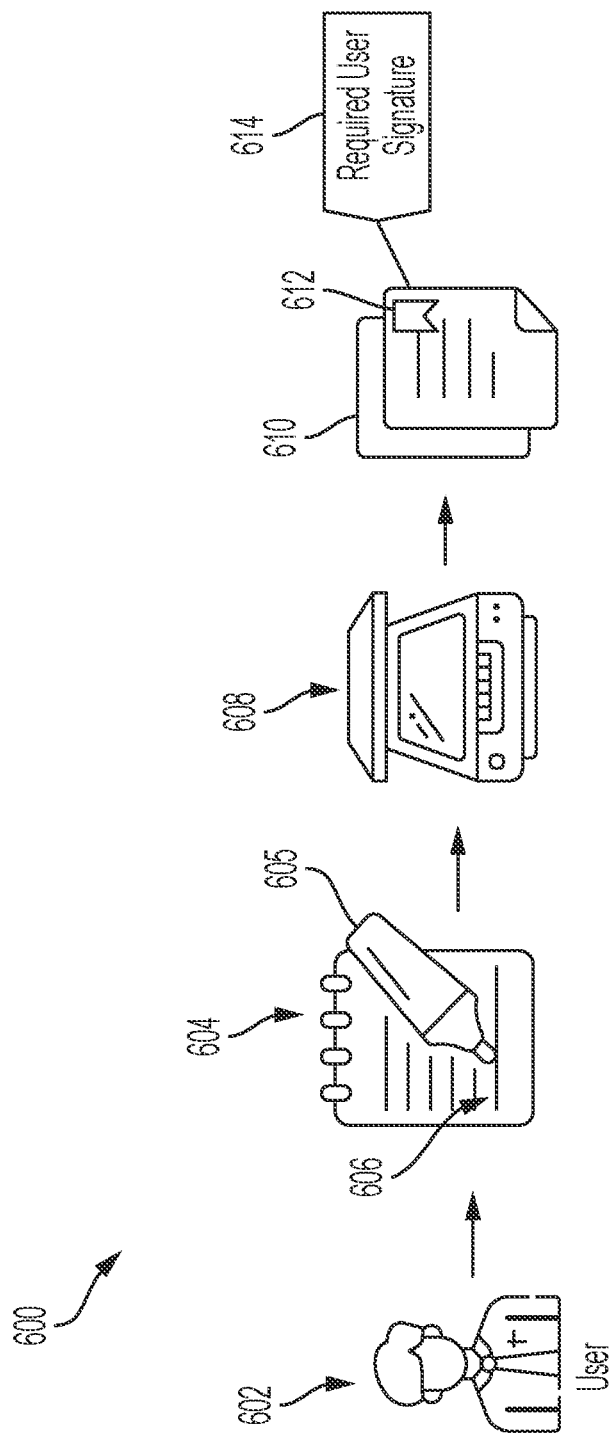
FIG. 6 is an exemplary snapshot illustrating yet another implementation of the present disclosure.

FIG. 6 illustrates additional exemplary implementation 600 of the present disclosure. The implementation 600 allows addition of one or more bookmarks in a document based on highlighted text, while scanning the document. As shown, a user 602 wishes to scan a document 604 having one page. The document 604 includes a highlighted text 606 that is highlighted by the user using a highlighting tool 605. The user 602 submits the document 604 at a multi-function device 608 for scanning. While submitting the document 604, the user 602 selects an option to add one or more bookmarks to the document based on availability of a highlighted text. Once the option is selected, the multi-function device 608 initiates scanning. Upon scanning, an output scanned document 610 is obtained having bookmark added to the page having the highlighted text 606. The user also selected an option to add a note along with the bookmark symbol. Therefore, the bookmark includes a note 614 such that the note (i.e., "Required User Signature") is shown to a recipient when he hovers over the bookmark 612. This way, bookmarks can be added to pages of the document including highlighted text.

Exemplary Flowchart

Figure 7:
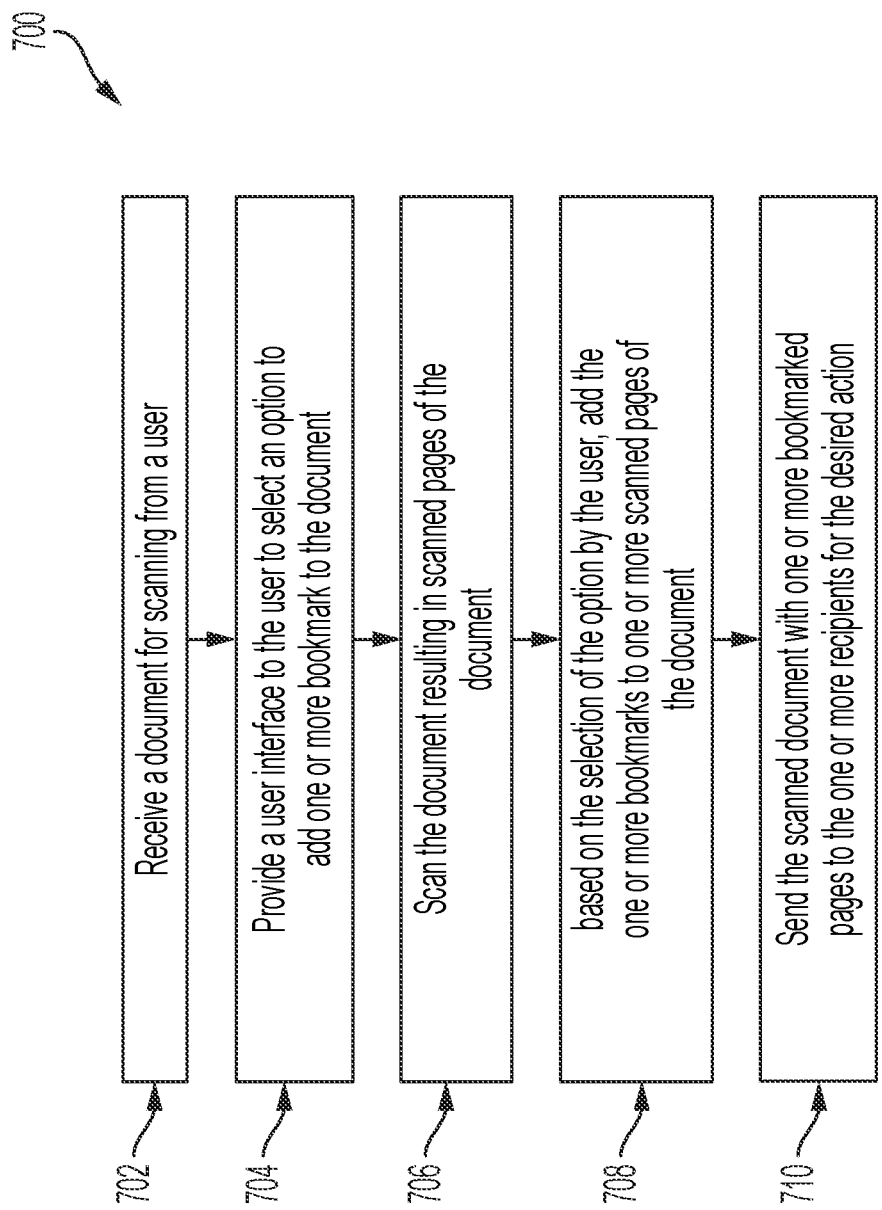
FIG. 7 is an exemplary method flowchart for allowing a user to add one or more bookmarks while scanning a document, in accordance with an embodiment of the present disclosure.

FIG. 7 is an exemplary method flowchart 700 for allowing a user to add one or more bookmarks while scanning a document, in accordance with an embodiment of the present disclosure. The method 700 may be implemented at a multi-function device, such as the multi-function device 102 of FIG. 1, or the multi-function device 200 of FIG. 2. However, the method 700 can be implemented at any equivalent device with scan functionality.

The method begins when a user wishes to add one or more bookmarks to one or more pages of a document while scanning the document. The user initiates the method 700 by submitting the document for scanning at the multi-function device. To submit the document, the user places the document on a platen or Automatic Document Handler (ADH) of the multi-function device. The document is received for scanning from the user, at 702.

Once the document is received, a user interface is provided to the user to select an option to add one or more bookmark to the document, at 704. Examples of the options to add bookmarks may include, but not limited to, bookmark based on page numbers, bookmark based on page ranges, bookmark based on keywords, bookmark based on preview, bookmark based on blank pages, or the like. The user selects the option of his choice to bookmark one or more pages of the document. Upon selection of the option, the scanning is initiated, and scanned pages of the document are generated at 706. While in the present method, the pages are bookmarked after the document is scanned and scanned pages are generated, it can be considered that the method can be implemented to bookmark pages in parallel while the scanning of the document is in progress.

Based on the selection of the option by the user, the user also provides his input to add one or more bookmarks to one or more scanned pages of the document at 708. For example, if the user selects the option of adding bookmarks based on page numbers or page ranges, the user provides his input to specify the page numbers or ranges that are to be bookmarked. Based on his inputs, the selected pages are identified, and bookmarks are added to the selected page number or page ranges during and/or after scanning. As a result, at 708, the scanned document generated includes the bookmarks added to the selected page number or page ranges. In another example, if the user selects an option of adding one or more bookmarks based on keywords, the user inputs one or more keywords such that the scanned pages having the keywords provided by the user are bookmarked. In an additional example, the user selects an option of adding the one or more bookmarks based on blank pages such that pages having a blank page after and/or before are to be bookmarked. As a result, at 708, the pages having blank pages placed before or after the page are bookmarked. In one more example, the user selects an option of adding the one or more bookmarks based on highlighted content/text. The above option allows automatic addition of bookmarks on the pages having highlighted text. For example, upon identification of the pages including highlighted text, the pages are automatically bookmarked, and preview of the pages is shown for user's review and confirmation. As a result, the scanned pages obtained at 708 includes one or more bookmarks added to the pages having highlighted text. This way, based on user selected option, the one or more bookmarks are added to the one or more scanned pages of the document at 708.

Subsequently, preview of the scanned pages is displayed via a user interface to the user. The preview allows the user checks/reviews scanned pages and confirm if the bookmarks are added to the required pages. At this step, the user can add and/or remove bookmarks to/from one or more scanned pages as per his choice. In addition, the user can make changes in the selection of page numbers, page ranges, keywords, and so on to dynamically add and/or remove one or more bookmarks to/from one or more scanned pages. Further, while previewing the scanned pages, the user can add a note to the one or more bookmarks. The notes are added to define a pre-defined action that needs to be taken by one or more recipients of the scanned document. For example, if a bookmark is added to remind a user about signing the bookmarked page(s), a note can be added to provide details about where the signature on the page(s) is required, and so on. Once the user adds the notes and confirms the one or more bookmarks added to the one or more scanned pages, the method proceeds to generate a scanned document. The scanned document is a final digital version of the document that can be shared with the recipients either via email or using other suitable ways.

Once the scanned document is generated, at 710, the user sends the scanned document to the one or more recipients for a desired action. For this, the user adds one or more email addresses of the one or more recipients to whom he wishes to send the scanned document. Once added, the user sends the scanned document to the added recipients for the desired action. Further, the one or more recipients receives the scanned document and views the added one or more bookmarks to take the desired action. For example, if one of the added bookmarks includes a note requesting the recipient to sign the page, the recipient signs the page. Further, another bookmark may include a note to mention today's date and sending the signed document back to the sender. As a result, the recipients sign the document along with mentioning todays' date and email the signed document back to the sender. In some cases, upon receiving the scanned document, the one or more recipients may print the document for desired action. For instance, a recipient may print the received scanned document, sign the pages including the bookmarks and then share the signed document with the user (i.e., the sender) and/or other users. The recipient may either share the physical version of the signed document with the user or may scan the signed document to share a digital version of the scanned document with the user/sender and/or other users.

This way, the method 700 allows a user to add one or more bookmarks while scanning the document such that the added bookmarks can be viewed by the user as well as the one or more recipients of the scanned document. Upon viewing the bookmark and the added note, the recipient takes a pre-defined action.

The present disclosure discloses methods and systems for adding one or more bookmarks to a document while scanning the document. The methods and systems save user's time as he can scan as well as bookmark the desired scanned paged as a single scan activity. Here, the user is not required to use a separate computing device or a third-party tool for adding bookmarks to the desired scanned pages. The methods and systems allow addition of bookmarks to the document based on user inputs. The addition of bookmarks is done when the user scans the document at the multi-function device and no third-party tool is required for addition of bookmarks in the scanned document. Once the user provides his input for addition of bookmarks, no human intervention is involved. This way the present disclosure facilitates automatic addition of one or more bookmarks while the user scans the document, thereby requires minimal user efforts. The methods and systems also recognize highlighted text to add bookmarks on the scanned pages including highlighted text, therefore minimal user inputs are required to automatically scan and bookmark the document. The methods and systems also allow addition of notes along with the bookmarks to provide details of a desired action to one or more recipients of the scanned document. This way, pages of a scanned document that are to be signed by a governed authority can be easily identified by the recipients.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Although the disclosure is discussed with respect to a multi-function device, but the disclosure may be implemented in form of an app which can be installed on any user device, for example, a mobile device. If the user device is a desktop, then the app may be a desktop app. If the user device is a mobile device, then the app may be a mobile app. For easy discussion, the scenario is discussed with mobile app as an example. The mobile app is configured such that the app allows the user to add one or more bookmarks while scanning a document using the mobile device. For example, the input document can be scanned via a camera of the mobile device or other ways. Here, the mobile app accesses the camera of the mobile device and requests the user to scan the document. This way, a scanned version of the document is obtained. Once the scanned document is obtained, the mobile app starts processing the scanned document to add one or more bookmarks. In some implementation, the bookmarks are added to one or more scanned pages that were selected by the user. In other implementations, the user can input one or more keywords based on which the app first identifies the pages including the keywords and then adds bookmarks to the identified pages. The one or more bookmarked pages are further shown to the user for his confirmation, through a user interface of the mobile app. The user can add any new keywords which allows addition of bookmark to additional pages of the input document. Once confirmed, an output document including one or more bookmarks added to the one or more pages is generated. The output document can be shared with the user or other users via email. The output document can be stored anywhere such as USB, hard disk, cloud storage or the like.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, adding, sending, identifying, displaying, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device for allowing a user to add one or more bookmarks while scanning a document, the multi-function device comprising:
 a receiver for receiving a document from a user for scanning;
 a user interface for allowing the user select an option to add one or more bookmarks to the document, wherein the option comprises at least: adding the one or more bookmarks based on page selection, adding the one or more bookmarks based on one or more keywords, adding the one or more bookmarks based on blank pages, and adding the one or more bookmarks based on highlighted content;

a scanner for scanning the document resulting in scanned pages of the document;

a controller for:

based on the selection of the option by the user, adding one or more bookmarks to one or more scanned pages of the document, wherein the one or more added bookmarks indicate a pre-defined action to be taken by one or more recipients; and sending the scanned document comprising the one or more bookmarked pages to the one or more recipients for the desired action.

2. The multi-function device of claim 1, wherein adding the one or more bookmarks comprises at least: adding a symbol indicating the one or more bookmarks and a note defining the pre-defined action for the one or more recipients.

3. The multi-function device of claim 1, wherein the user interface is for allowing the user to input the note indicating the pre-defined action for the one or more recipients.

4. The multi-function device of claim 1, wherein the user interface is for displaying the added one or more bookmarks to the one or more scanned pages of the document to at least: the user and the one or more recipients, upon viewing.

5. The multi-function device of claim 1, wherein the user interface is for displaying a preview of the one or more bookmarked pages to the user along with corresponding notes, for confirmation.

6. The multi-function device of claim 1, wherein the controller is for, if the user selects the option of adding the one or more bookmarks based on page selection, allowing the user to select the one or more scanned pages for adding the one or more bookmarks.

7. The multi-function device of claim 1, wherein the controller is for, if the user selects the option of adding the one or more bookmarks based on the one or more keywords, providing a user interface to the user to input the one or more keywords.

8. The multi-function device of claim 7, wherein the controller is for identifying one or more scanned pages comprising the one or more input keywords, for adding the one or more bookmarks to the one or more scanned pages of the document.

9. The multi-function device of claim 1, wherein the controller is for, if the user selects the option of adding the one or more bookmarks based on blank pages, allowing the user to further define adding the one or more bookmarks before or after the blank pages.

10. The multi-function device of claim 1, wherein the controller is for, if the user selects the option of adding the one or more bookmarks based on highlighted content, identifying the highlighted content in scanned pages of the document.

* * * * *